April 21, 1925.
J. W. OWENS
1,534,865
STRAIN GAUGE
Filed Nov. 15, 1921
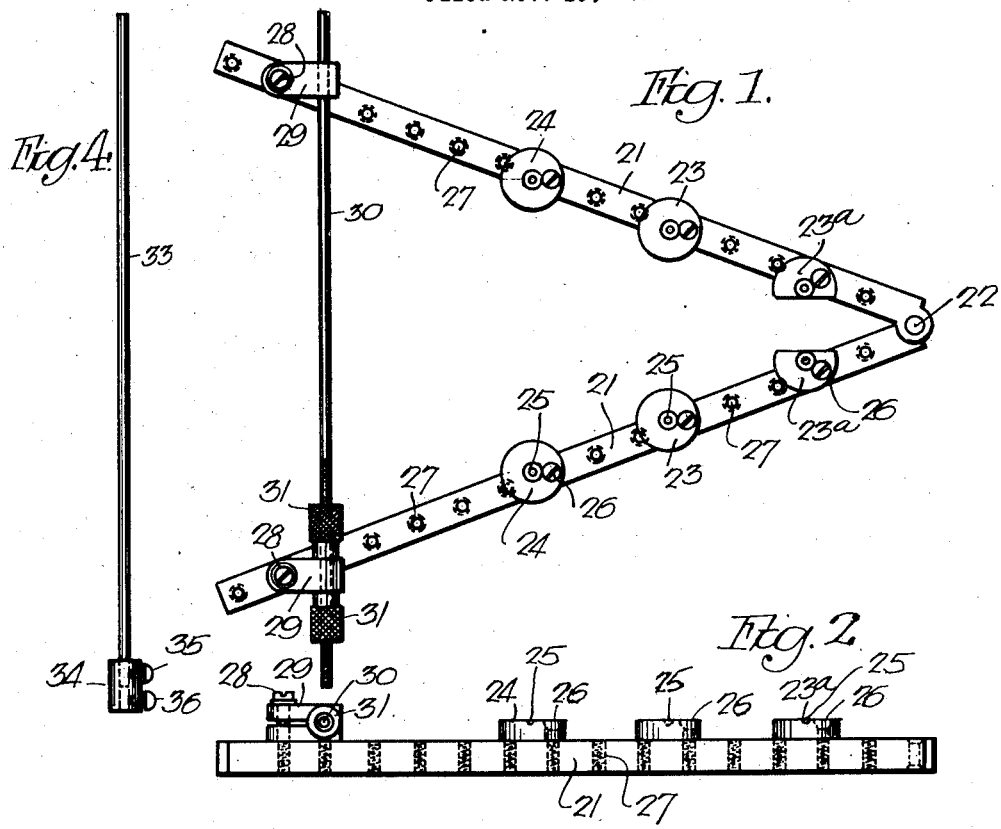
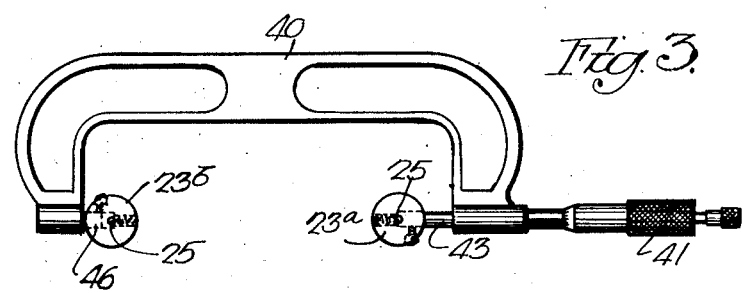
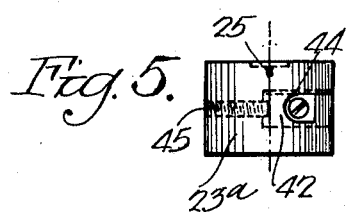
Inventor
James W. Owens
by his Attorneys
Howson & Howson Patented Apr. 21, 1925.

1,534,865

UNITED STATES PATENT OFFICE.

JAMES W. OWENS, OF CRADOCK, VIRGINIA, ASSIGNOR TO TINIUS OLSEN TESTING MACHINE COMPANY, OF PHILADELPHIA, PENNSYLVANIA, A CORPORATION OF PENNSYLVANIA.

STRAIN GAUGE.

Application filed November 15, 1921. Serial No. 515,236.

*To all whom it may concern:*

Be it known that I, JAMES W. OWENS, a citizen of the United States, residing in Cradock, Virginia, have invented the Strain Gauge, of which the following is a specification.

One object of this invention is to provide a relatively simple, conveniently manipulated and accurate device for setting the distance between the specimen-engaging points of a fixed or variable strain gauge, which device shall be of such a nature as to be adaptable for measurements between widely separated limits.

These objects and other advantageous ends I attain as hereinafter set forth, reference being had to the accompanying drawings, in which, Figs. 1 and 2 are respectively a plan and a side elevation of the setting device forming my invention;

Fig. 3 is a plan of a modified form of setting or measuring instrument which may be used as part of my invention:

Fig. 4 is an elevation of an extension rod for use with that form of setting device shown in Figs. 1 and 2; and Fig. 5 is an elevation of one of the buttons used with the device shown in Fig. 3.

In the testing of materials or structures to determine their behavior under stress, it is desirable to measure with extreme accuracy the distance between two given points such as center punch marks, to determine, for instance, the elongation of a test specimen or the distortion or deflection of its members under stress, and for this purpose a pair of buttons 23 is adjusted as hereafter described, so that their center holes 25 are the distance apart which it is desired to measure in the specimen under test.

The specimen-engaging points of the fixed or variable strain gauge are inserted in the center holes of a pair of buttons which have been previously set and the reading of the strain gauge noted, which reading is regarded as zero. The specimen engaging points of the strain gauge are now inserted in the center punch or other holes of the specimen to be measured and the reading is noted. Said reading will be a definite amount plus or minus the zero distance previously obtained by means of buttons on the setting gauge. Subsequent readings on specimens during or subsequent to the application of stress will also be a definite amount plus or minus of this zero reading. By referring all readings to zero the change in the distance between the measuring points of the specimen can be readily determined.

That form of my device shown in Figs. 1 and 2 consists of a pair of bars 21 pivoted together by a pin or bolt 22 and having a series of threaded holes 27 in which a pair of circular buttons 23—23 can be suitably located. It is noted that each of these buttons has at the center of one face a small accurately centered hole or conical depression 25 and is connected to its supporting bar 21 by an eccentrically applied screw or bolt 26 whereby it may be rigidly clamped in place. Openings 27 for the reception of the screws 26 are preferably regularly spaced so that the buttons 23 may be applied in pairs, each of whose individual buttons may be arranged at any convenient distances apart.

On the free ends of the bars 21 are mounted clamps 29 provided with clamping screws 28 for the reception of an adjusting rod 30. This rod is rigidly gripped by one of the clamps 29 and is slidable through the other clamp, having threaded to it on opposite sides of the latter adjusting nuts 31. By means of these nuts the bars 21 may be turned on their pivot 22 to vary the angle between them and thus vary the distance between the buttons 23 of any particular pair and between their central holes 25. Each of the buttons is hardened and accurately ground to a predetermined diameter such for example as one inch. Central holes 25 of any pair of buttons can be accurately spaced any predetermined distance apart by calipering the cylindrical surfaces of these buttons with either inside or outside micrometers of standard make, such adjustment being facilitated by means of nuts 31 on the rod 30. After a suitable gauge has been applied to spaced marks or center punch holes on a test specimen or other object, its center points are entered in the center holes 25 of a pair of opposite buttons 23 brought to the necessary distance apart to permit of this operation, and the measurement exactly reproduced.

For increasing the range of the device shown in Figs. 1 and 2 I may if desired attach to the rod 30 an extension rod 33, for which purpose I provide a coupling sleeve 34 connected to said extension by a set screw 35. A second set screw 36 is employed to clamp said coupling to the unthreaded end of the rod 30. Obviously by this means the bars 21 may be adjusted to define or subtend a greatly increased angle between them, so that they are thus suited for measurements of greater distances.

In place of the device shown in Figs. 1 and 2 I may employ that illustrated in Fig. 3, which consists of a C- or U-shaped frame 40 having a micrometer head of well known form, such as indicated at 41, mounted in one of its arms, and carrying on its stem a circular button 23$^a$ similar in general construction to that employed in the device of Figs. 1 and 2. A second and similar button 23$^b$ is mounted on the other arm of the frame 40 and each of these buttons in addition to being of definite predetermined diameter, has a central hole or depression 25 as hereinbefore described.

For connecting these buttons 23$^a$ and 23$^b$ to the frame 40 each of them is provided with a radially extending hole as indicated at 42 for the reception of the stem 43 of the micrometer and this hole is preferably made of a depth slightly greater than the radius of said button. Axially in line with said hole is a threaded passage for the reception of an adjusting screw 45 and in addition a set screw 44 is threaded into each button for the purpose of clamping it to the stem 43 or other rod 46 as the case may be. By means of the screw 45 the position of the button on its stem or rod may be regulated with the utmost nicety, after which it may me clamped in the given position by the set screw 44.

If desired I may cut away the adjacent sides of that pair of buttons 23$^a$ nearest the pivot 22 in that form of my invention shown in Figs. 1 and 2, so as to provide them with adjacent plane portions and permit of their centers more closely approaching each other than would otherwise be possible. Obviously while the screws 26 are designed to clamp the buttons in definite positions on their supporting bars, said buttons being eccentrically mounted on the screws, may be swung toward or from each other so that their positions may be quickly adjusted prior to the application of the strain gauge.

Under certain conditions I may utilize a pair of buttons both mounted on the same bar 21 in making the measurements above described, and in such case I adjust either or both buttons on their supporting screws to bring their central depressions 25 the desired distance apart.

I claim:

1. The combination in a measuring instrument of a pair of bars hinged together and each having therein at definite distances from the point of connection of said bars a set of parts carrying recesses for the reception of centering points; with means for adjusting said bars to vary the angle between them, said parts being independently adjustable.

2. The combination in a measuring instrument of a pair of bars hinged together adjacent one end; with a series of buttons mounted on said bars, each having a recess for the reception of a centering point of a measuring instrument, said buttons being relatively adjustable.

3. The combination in a measuring instrument of a pair of bars hinged together adjacent one end; with a series of buttons on said bars each having a recess for the reception of a centering point of a measuring instrument; with means for adjusting the angle of the bars to vary the distance between the buttons.

4. The combination in a measuring instrument of a pair of bars hinged together; and a series of buttons mounted on the bars and each eccentrically connected thereto, there being a center point recess in each of said buttons.

5. The combination in a measuring instrument of two bars hinged together; with at least two circular buttons respectively mounted on said bars at fixed distances from the point of connection of said bars and each having a central center-point-receiving recess, said buttons being rotatably mounted.

6. The combination in a measuring instrument of two bars hinged together; with at least two circular buttons rotatably adjustable on said bars and each having a central center-point-receiving recess, the adjustment of one button being adapted to vary the spacing thereof with respect to an adjacent button.

7. The combination in a measuring instrument of two bars hinged together; at least two circular buttons respectively mounted on said bars each having a conical center-point-receiving recess; a rod connected to one of said bars having a threaded portion extending through the other bar; with at least one adjusting nut on the threaded portion of said rod.

8. The combination in a measuring instrument of relatively movable members; and buttons eccentrically mounted thereon.

9. The combination in a measuring instrument of two members movably connected together; with circular buttons respectively mounted on said members and each having a central conical center-point-receiving recess.

10. The combination of a supporting structure; with a pair of buttons rotatably adjustable thereon and each having a center point recess.

11. The combination of a supporting structure; with a pair of circularly curved buttons eccentrically mounted thereon and each having a center point recess, said buttons being adjustable to vary the distance between their center point recesses.

12. The combination of a supporting structure, a pair of circular buttons each having a central recess and elements respectively connecting said buttons to the structure leaving them free to be adjusted eccentrically to their central recesses.

JAMES W. OWENS.